(12) United States Patent
Spitz et al.

(10) Patent No.: US 9,226,127 B2
(45) Date of Patent: Dec. 29, 2015

(54) METHOD FOR PROVISIONING OF A NETWORK ACCESS FOR A MOBILE COMMUNICATION DEVICE USING THE MOBILE COMMUNICATION DEVICE

(75) Inventors: Stephan Spitz, Karlsfeld (DE); Hermann Sterzinger, Baldham (DE); Robert John Brown, Berkshire (GB)

(73) Assignees: GIESECKE & DEVRIENT GMBH, Munich (DE); ARM LIMITED, Cambridge (GB)

( * ) Notice: Subject to any disclaimer, the term of this patent is extended or adjusted under 35 U.S.C. 154(b) by 39 days.

(21) Appl. No.: 13/248,171

(22) Filed: Sep. 29, 2011

(65) Prior Publication Data

US 2012/0083242 A1  Apr. 5, 2012

(30) Foreign Application Priority Data

Oct. 1, 2010  (EP) .................................. 10013133

(51) Int. Cl.
| | |
|---|---|
| *H04M 1/66* | (2006.01) |
| *H04W 4/24* | (2009.01) |
| *H04L 29/06* | (2006.01) |
| *H04M 15/00* | (2006.01) |
| *H04M 17/00* | (2006.01) |
| *H04W 12/06* | (2009.01) |

(52) U.S. Cl.
CPC ................. *H04W 4/24* (2013.01); *H04L 63/08* (2013.01); *H04M 15/00* (2013.01); *H04M 15/48* (2013.01); *H04M 15/49* (2013.01); *H04M 15/745* (2013.01); *H04M 17/00* (2013.01); *H04W 12/06* (2013.01); *H04M 2215/0108* (2013.01); *H04M 2215/0156* (2013.01); *H04M 2215/0168* (2013.01); *H04M 2215/20* (2013.01); *H04M 2215/46* (2013.01)

(58) Field of Classification Search
CPC ..... H04M 15/43; H04M 15/48; H04M 15/52; H04M 15/67; H04W 2/24
See application file for complete search history.

(56) References Cited

U.S. PATENT DOCUMENTS

2005/0176405 A1 *  8/2005  Maeda .......................... 455/406

FOREIGN PATENT DOCUMENTS

| WO | 0207050 | 1/2002 |
|---|---|---|
| WO | 2008128873 | 10/2008 |

(Continued)

OTHER PUBLICATIONS

Search Report of EPO related to EP 10013133.3-1246, Mar. 7, 2011.

(Continued)

*Primary Examiner* — Keith Fang
(74) *Attorney, Agent, or Firm* — Bacon & Thomas, PLLC

(57) ABSTRACT

The invention refers to a method for provisioning of a network access for a mobile communication device having at least one communication interface. A mobile communication device comprising a secure payment application in a secure environment is provided. Network access from a network operator with the mobile communication device is requested. A payment to the network operator for the requested network access using the secure payment application is conducted. A network access application from the network operator is downloaded and the network access application in the secure environment of the mobile communication device is stored wherein the network access application is used for an authentication of the mobile communication device to the mobile network.

16 Claims, 2 Drawing Sheets

(56) References Cited

U.S. PATENT DOCUMENTS

| | | | |
|---|---|---|---|
| 2008/0109877 A1* | 5/2008 | Park et al. | 726/3 |
| 2008/0260149 A1 | 10/2008 | Gehrmann | |
| 2009/0205028 A1* | 8/2009 | Smeets et al. | 726/6 |
| 2011/0086616 A1* | 4/2011 | Brand et al. | 455/411 |
| 2011/0162078 A1* | 6/2011 | Taveau et al. | 726/26 |
| 2012/0089520 A1* | 4/2012 | Mardikar | 705/71 |

FOREIGN PATENT DOCUMENTS

| | | |
|---|---|---|
| WO | 2009040761 | 4/2009 |
| WO | 2009098130 | 8/2009 |

OTHER PUBLICATIONS

Extended European Search Report regarding EP 10013133.3-1246, Mar. 7, 2011.

\* cited by examiner

METHOD FOR PROVISIONING OF A NETWORK ACCESS FOR A MOBILE COMMUNICATION DEVICE USING THE MOBILE COMMUNICATION DEVICE

BACKGROUND OF THE INVENTION

1. Field of the Invention

The invention relates to a method for provisioning of a network access to a mobile communication device having at least one communication interface.

2. Related Art

Mobile communication devices like cell phones, computers, notebooks, game pads, watches and so on need a subscription identity information to gain access to a communication network. Typically, this subscription identity information is stored in a so-called subscriber identity module (SIM). Each SIM comprises a tamper-resistant circuit module, commonly embodied in a small, card-like form factor, where the circuit modules stores credential information for a specific network operator of the communication network. As a consequence, the user of the mobile communication device is tied to a particular network operator by virtue of the programmed SIM. To make the mobile communication device operational, a network operator marks that SIM as active in one or more subscriber databases.

A disadvantage of this procedure is that the user of the mobile communication device is bound to one specific operator once the SIM is activated. I.e., a dynamic switching between different operators depending on parameters like tariff, network bandwidth, network availability and so on, and is only possible by a handover triggered manually by an operator of the communication network to which the mobile communication device is bound. WO-publication 2009/098130 A2 discloses a method to facilitate an over-the-air activation of mobile devices through the use of preliminary subscription identity information maintained in centralized device directory that are accessible by a network operator. The communication devices are preconfigured by their manufacturers to use preliminary access credentials to gain temporary network access for downloading subscription credentials. The network operator which is issuing the subscription credentials can verify that individual devices requesting credentials are trusted. The preliminary credential stored in a secure processing module of the mobile communication device will be replaced by a final credential which is to be stored in the secure processing module, too.

The method disclosed simplifies manufacturing, sales and the registration of mobile communication devices with regard to secure over-the-air provisioning. Furthermore, security is enhanced since the number of actors being responsible for the operation of many of the involved steps is reduced. However, the method disclosed in WO 2009/098130 A2 may enable an automated provisioning process. However, the mobile communication device is bound to one specific operator. As a result, dynamic switching between different operators is not supported by the method according to the prior art.

It is therefore an object of the present invention to provide a method for provisioning of a network access for a mobile communication device which allows the user of the mobile communication device to choose a network access more flexibly.

SUMMARY OF THE DISCLOSURE

The invention suggests a method for provisioning of network access for a mobile communication device having at least one communication interface. The method comprises the steps of: providing a mobile communication device comprising a secure payment application in a secure environment; requesting network access from a network operator with the mobile communication device; conducting a payment to the network operator for the requested network access using the secure payment application; and downloading a network access application from the network operator and storing the network access application in the secure environment of the mobile communication device wherein the network access application is used for an authentication of the mobile communication device to the mobile network.

With the invention, the user of the mobile communication device is able to select on demand at any time a mobile operator which fits best for his or her needs. The only requirement to be able to select on demand one of a number of network operators (each of them being responsible for different communication networks) is that the mobile communication device is equipped with a payment functionality. With the help of this payment functionality it is possible to pay the network operator of the desired network for the access to this network.

To provide a secure access system the access application which is necessary for an authentication of the mobile communication device to the mobile network is stored in the secure environment of the mobile communication device. Without the network access application the mobile communication device would not be able to connect to and access a desired network.

It is to be noted that it is possible that network access may be requested from different network operators being assigned to different communication networks in parallel. In this way the user of the mobile communication device is able to switch between different communication networks at any time. Especially, the user of the mobile communication device can choose the communication network which fits best for his or her needs.

The steps of requesting network access, conducting a payment to the network operator and downloading a network access application can be executed via an unsecured communication channel. However, it is preferred if the communication between the mobile communication device and the network operator is made via a secured communication channel during the "purchase" of the network access.

In a preferred embodiment a network access of the mobile communication device is granted as long as the network access application is stored in the secured environment. This enables the user of the mobile communication device that a repeated access to a network is possible with one "purchase" of a network access.

According to a further preferred embodiment the network access application is temporarily stored in the secure environment. With this embodiment the resources of the secure environment of the mobile communication device can be kept low. Temporarily storing of the network access application in the secure environment ensures that only valid or used network access applications are stored within the mobile communication device.

According to a further preferred embodiment the duration of storage or validity of the network access application is dependent on at least one parameter described by the network operator. The duration of storage or validity of the network access application for example may be the longer the more the user of the mobile communication device pays for the network access application. However, the duration of storage or validity of the network access application can be specified by the network operator according to technical facts like the bandwidth, the kind of the communication network, and other variable parameters.

According to a further preferred embodiment downloading the network access application comprises downloading an authentication key and/or an authentication algorithm of the mobile network to be accessed. The authentication key and/or the authentication algorithm may be received from the network operator directly or a specific component of the network to be accessed or any other service entity.

According to a further embodiment the authentication key and/or the authentication algorithm in the secure environment of the mobile communication device are invalidated or deleted after having reached in invalidation time and/or date. To prevent an access to a network after a default time it is additionally or alternatively possible that the authentication key is invalidated or deleted in the accessed network after reaching an invalidation time and/or date. To make the access to a specific network impossible it is sufficient to invalidate or delete the authentication key of the network access application. In contrast, the authentication algorithm could stay stored in the mobile communication device. If the user of the mobile communication device wants to access the network again after the invalidation of the authentication key he could pay for further access and just receive the authentication key. The authentication key then can be processed by the authentication-algorithm to again get an access to the network. In this embodiment the amount of data to be exchanged between the mobile communication device and the network operator could be reduced.

According to a further preferred embodiment the requested network can be chosen freely from a user of the mobile communication device.

In a further preferred embodiment conducting the payment to the network operator for the requested network access requires the following steps: receiving a personal identification number which is to be input in the mobile communication device by its user; verifying the personal identification number through the mobile communication device; in case that the verifying process is successful paying the network operator. Generally, the way the payment is made is not relevant for the invention. However, paying the operator could be made by transferring a credit card number of the user which is stored in the secure environment of the mobile communication device. Otherwise, the payment could be made by electronic cash or in any other way. In principle, payment is possible with prepaid or post-paid mechanisms or an electronic purse.

In one alternative conducting the payment to the network operator for the requested network access comprises a direct communication and payment, respectively, to the network operator. In a second alternative conducting the payment to the network operator for the requested network access comprises an indirect payment to the network operator via a communication with a third party payment provider.

According to a further preferred embodiment, the secure payment application is permanently stored in the secure environment. It is preferred that the secure payment application is a reliable, widely accepted payment mechanism to enable the "purchase" of network access to a specific network.

DESCRIPTION OF THE DRAWINGS

The invention will be described by reference to the figures.

DETAILED DESCRIPTION OF PREFERRED EMBODIMENTS OF THE INVENTION

Figure 1:
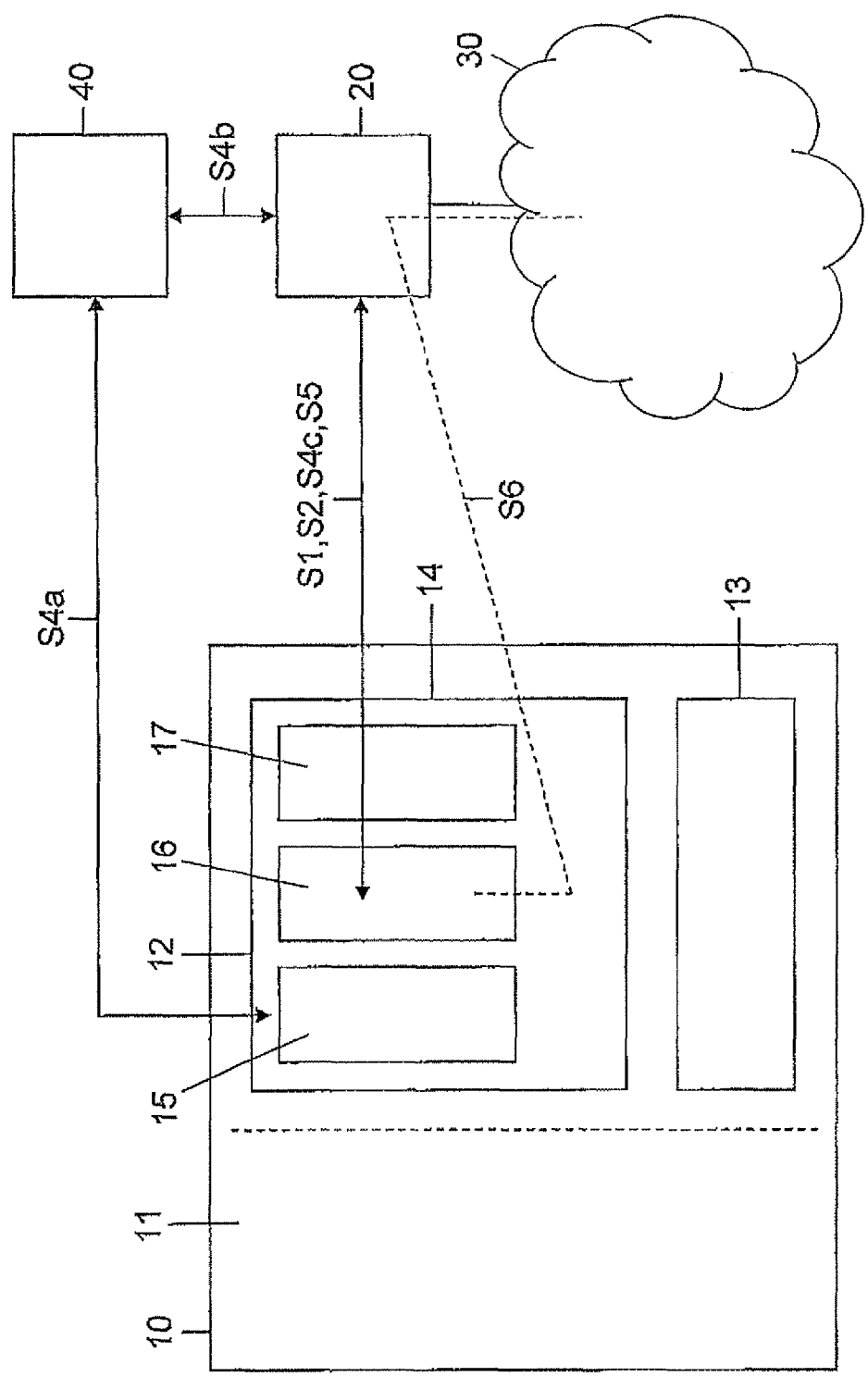
FIG. 1 shows the basic components of a mobile communication system executing the method according to the invention.

FIG. 1 shows the components involved for executing the method for provisioning of a network access for a mobile communication device 10. Besides the mobile communication device 10 seeking for network access a network operator 20, a communication network 30 and an optional third party payment provider 40 are shown.

The mobile communication device 10 can be a mobile cell phone, a notebook, a netbook, a game pad, a watch and so on. The mobile communication device 10 comprises at least one communication interface. The communication interface(s) could be of any type. For example, the communication interface could be a GSM (global system for mobile communication)-interface, a UMTS (universal mobile telecommunication system)-interface, a WLAN (wireless local area network)-interface, and so on.

As prior art communication devices the mobile communication device 10 is able to exchange data with a number of communication networks each of them being under the control of a specific provider or operator. In FIG. 1 only one communication network 30 of all possible accessible communication networks is illustrated by way of example. It is to be noted that the communication technology of the communication network 30 is not relevant for the invention. The network operator 20 represents an entity which is responsible for an authentication of each mobile communication device gaining for access to the communication network 30.

While prior art mobile communication devices are bound to one specific operator, the mobile communication device according to the invention is adapted to freely choose the communication network the user of the communication device wants to have access.

The communication device 10 therefore comprises an unsecured environment 11 with an unsecure operating system and a secure environment 12. The secure environment 12 may be based on ARM's® TrustZone® technology. The TrustZone is depicted with reference numeral 13. Within the hardware components of the TrustZone 13 a secure operation system like MobiCore® may be implemented. The MobiCore security is based on the principle of isolation. This is realized by the combination of ARM TrustZone hardware and MobiCore software. The main processor of TrustZone 13 is enhanced by an additional secure execution mode which is called the TrustZone secure world. MobiCore is the secure operating system and is responsible for program execution within this secure environment. As a result, all data processed in the secure environment are strictly isolated from data processed in the unsecure environment.

Secure applications 15, 16, 17 running within the secure operating system MobiCore 14 are known as trustlets. They are protected from data leakage or malicious intrusion via unsecure environment applications. Moreover, the secure applications 15, 16, 17 are separated from each other. This ensures that erroneous or malicious code can never influence a secure application 15, 16, 17 running on the secure operating system 14. It is to be noted that the number of secure applications can differ from the illustrated three secure applications 15, 16, 17, but will be never less than two.

The secure application 15 is a permanent payment trustlet which is required for the provisioning of a network access to a desired communication network (here communication network 30). The payment trustlet 15 provides a payment functionality of any kind. The payment functionality can be pre-paid, post-paid or an electronic purse. The payment functionality furthermore can make use of credit cards. With help of this payment functionality the user of the mobile communication device 10 is able to select on demand the network provider which is preferred for the moment.

The control of different services provided by different communication networks is made with the help of the secure applications 16, 17 which can be stored in the secure environment 12 and will be executed by the secure operating system 14. The payment application 15 (also referred to payment trustlet) is the root for activating them. All other applications or trustlets are dynamically deployed depending on the services the user of the mobile communication device 10 wants to wish.

Figure 2:
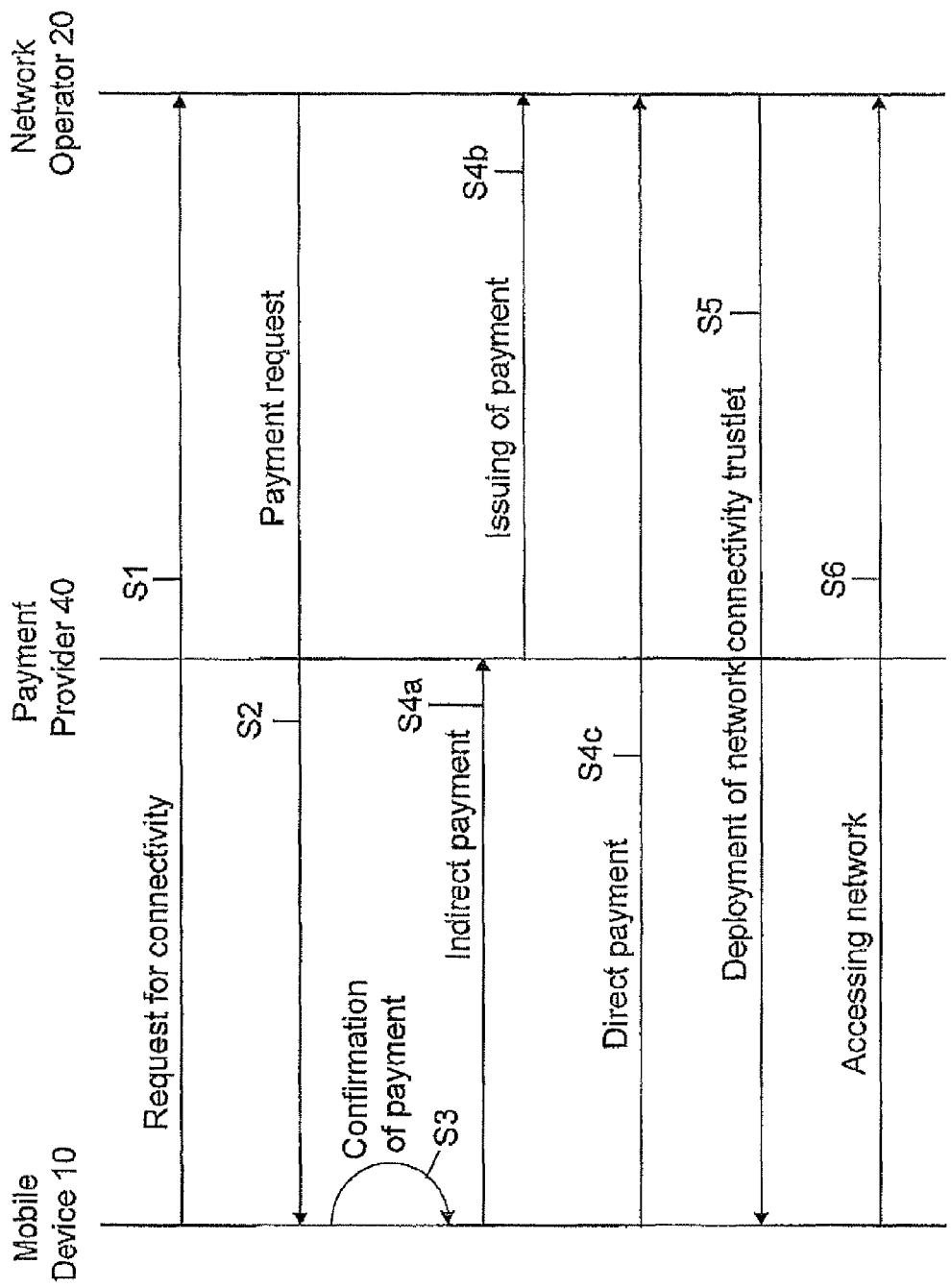
FIG. 2 shows the functionality of the method according to the invention by way of the communication procedure between the components involved.

Referring to FIG. 2 the communication path between the mobile device 10 requesting network access from the network operator 20 is illustrated. Furthermore, as an optional component, the payment provider 40 may be involved in this communication, too.

In a first step S1 the mobile device 10 requests for connectivity to the network operator 20 of communication network 30 the mobile device 10 wants to connect to. As an answer to this request for connectivity the network operator 20 transmits a payment request to the mobile device 10 (cf. step S2). The mobile device 10 processes this payment request and makes a confirmation of payment (step S3). For conducting the payment to the network operator one of the two illustrated alternatives may be chosen. In step S4a and step S4b of the first alternative an indirect payment via the payment provider 40 is chosen. In the second alternative (cf. step S4c) a direct payment from the mobile device 10 to the network operator 20 is performed. Releasing the payment functionality could be made dependent from a correctly identified personal identification number which is to be input by the user of the mobile communication device 10 in case he wants to request a network access. In the first alternative with the indirect payment via the payment provider 40, payment could be made with an authentication between the mobile device 10 and the payment provider 40. In case of a positive authentication the payment provider 40 makes an issuing of payment (step S4b). In the second alternative of the direct payment (step S4c) for example a credit card number of the device's user can be transferred from a memory of the payment application 15 to the network operator 20 directly.

After having received payment information the network operator 20 deploys a network access application which is called network connectivity trustlet. This network connectivity trustlet comprises an authentication key and an authentication algorithm. The network connectivity trustlet is stored as a secure application 16. The authentication key and/or the authentication algorithm of the network connectivity trustlet may be temporarily stored in the secure environment 12. The duration of storage of validity of the network connectivity trustlet can be made dependent on at least one parameter prescribed by the network operator. One of these parameters may be the amount of payment and/or the bought bandwidth and/or a bought time and so on.

After having loaded the network connectivity trustlet 16 into the secured environment 12 of the mobile communication device 10 the mobile device 10 can access the network 30 via the network operator 20 (cf. step S6). The network connectivity trustlet is used for an authentication of the mobile communication device to the network operator.

The authentication of the mobile communication device 10 to the mobile network 30 is only possible as long as the network connectivity trustlet is valid and/or is stored in the secure environment 12. After the expiration date of the network connectivity trustlet has been reached at least the authentication key can be invalidated in a database of the network operator 20 and also the corresponding secure application 16 containing the authentication key and the authentication algorithm may be deleted and/or made invalid.

Since the secure environment 12 of the mobile communication device 10 separates the individual secure applications 15, 16, 17 from each other it is possible that the user of the mobile communication device 10 loads a number of network connectivity trustlets being assigned to different communication networks into the secure environment 12 in parallel. In this case the user of the mobile communication device can switch between different communication networks.

In the example above, the additional security offered by the secure environment 12 of the mobile communication device 10 increases the flexibility of the mobile device. Different distribution channels of future mobile devices are taken into account. The network operator of a communication network is only one communication channel among others. Therefore, a connectivity using a specific communication interface of the mobile device is no longer a default feature and can be requested on demand. The only prerequisite for this is a reliable, widely accepted payment mechanism on the mobile device.

In contrast to prior art applications using the secure environment of a mobile device 10 is more flexible compared to storing of network connectivity information in a SIM-card. Storing of network connectivity information in a SIM leads to the result that every action concerning the network connectivity requires the consent of the provider of the communication network. The security environment based solution is more flexible. Even after authentication between the mobile communication device and the network operator further services can be paid and loaded onto the mobile device (either in the secure or the unsecure environment).

The invention claim is:

1. A method for provisioning network access for a mobile communication device having at least one communication interface, comprising:

providing a mobile communication device comprising a secure environment having a secure operating system and an unsecure environment having an unsecure operating system, wherein said secure environment comprises a secure payment application;

requesting communication network access from a network operator with the mobile communication device for the mobile communication device;

processing a payment to the network operator for the requested communication network access by the mobile communication device using the secure payment application executed in the secure environment by the secure operating system of the mobile communication device;

downloading a communication network access application from the network operator and storing the communication network access application in the secure environment of the mobile communication device and using the communication network access application executed in the secure environment by the secure operating system for an authentication of the mobile communication device to a mobile communication network, wherein separate communication network access applications are downloaded for different communication networks so that the mobile communication device is able to switch between the different communication networks, wherein downloading the communication network access application comprises downloading an authentication key and/or an authentication algorithm of the communication network to be accessed,
wherein the authentication key and/or the authentication algorithm in the secure environment of the mobile communication device are invalidated or deleted after having reached an invalidation time and/or date, and
wherein the communication networks are cellular networks.

2. A method for provisioning network access for a mobile communication device having at least one communication interface, comprising:
providing a mobile communication device comprising a secure environment having a secure operating system and an unsecure environment having an unsecure operating system, wherein said secure environment comprises a secure payment application;
requesting communication network access from a network operator with the mobile communication device for the mobile communication device;
processing a payment to the network operator for the requested communication network access by the mobile communication device using the secure payment application executed in the secure environment by the secure operating system of the mobile communication device;
downloading a communication network access application from the network operator and storing the communication network access application in the secure environment of the mobile communication device and using the communication network access application executed in the secure environment by the secure operating system for an authentication of the mobile communication device to a mobile communication network,
further comprising a step of downloading another communication network access application,
wherein downloading the communication network access application comprises downloading an authentication key and/or an authentication algorithm of the communication network to be accessed,
wherein the authentication key and/or the authentication algorithm in the secure environment of the mobile communication device are invalidated or deleted after having reached an invalidation time and/or date, and
wherein the communication network is a cellular network.

3. The method according to claim 2, including granting a network access of the mobile communication device to the respective communication network as long as the respective communication network access application is stored in the secure environment.

4. The method according to claim 2, including temporarily storing the communication network access application in the secure environment.

5. The method according to claim 2, wherein the duration of storage or validity of the communication network access application is dependent on at least one parameter prescribed by the respective network operator.

6. The method according to claim 2, wherein the authentication key is invalidated or deleted in the accessed network after having reached an invalidation time and/or date.

7. The method according to claim 2, wherein the requested communication network is freely selectible from a user of the mobile communication device.

8. The method according to claim 2, wherein the payment to the network operator for the requested communication network access is processed by:

receiving a personal identification number which is to be input in the mobile communication device by its user;
verifying the personal identification number through the mobile communication device;
in case that the verifying process is successful, paying the network operator.

9. The method according to claim 8, wherein processing the payment to the network operator for the requested network access includes using a direct communication and payment, respectively, to the network operator.

10. The method according to claim 8, including processing the payment to the network operator for the requested communication network access using an indirect payment to the network operator via a communication with a third party payment provider.

11. The method according to claim 2, wherein the secure payment application is permanently stored in the secure environment.

12. The method according to claim 2, wherein said another communication network access application is stored in the secure environment of the mobile communication device.

13. The method according to claim 12, wherein said another communication network access application is executed in the secure environment.

14. The method according to claim 13, wherein said mobile communication device is authenticated to another mobile communication network.

15. The method according to claim 14, wherein said mobile communication device is switchable between said mobile communication network and said another mobile communication network.

16. A method for provisioning network access for a mobile communication device having at least one communication interface, comprising:
providing a mobile communication device comprising a secure environment having a secure operating system and an unsecure environment having an unsecure operating system, wherein said secure environment comprises a secure payment application;
requesting communication network access from a network operator with the mobile communication device for the mobile communication device;
processing a payment to the network operator for the requested communication network access by the mobile communication device using the secure payment application executed in the secure environment by the secure operating system of the mobile communication device;
downloading a communication network access application from the network operator and storing the communication network access application in the secure environment of the mobile communication device and using the communication network access application executed in the secure environment by the secure operating system for an authentication of the mobile communication device to a mobile communication network;
requesting communication network access from another network operator with the mobile communication device for the mobile communication device;
processing a payment to the another network operator for the requested communication network access by the mobile communication device using the secure payment application executed in the secure environment by the secure operating system of the mobile communication device; and
downloading a another communication network access application from the another network operator and storing the another communication network access application in the secure environment for access to another mobile communication network wherein downloading the communication network access application from the network operator comprises downloading an authentication key and/or an authentication algorithm of the communication network to be accessed, and wherein the authentication key and/or the authentication algorithm in the secure environment of the mobile communication device are invalidated or deleted after having reached an invalidation time and/or date.

\* \* \* \* \*